Patented June 22, 1954

2,681,467

UNITED STATES PATENT OFFICE 2,681,467

VACUUM CLEANER WITH FLOOR STERILIZING MEANS

Reynolds Guyer, St. Paul, Minn.

Application December 4, 1948, Serial No. 63,600

2 Claims. (Cl. 15—339)

My invention relates to an improvement in floor sterilizers and the like wherein it is desired to sterilize the cleaned area simultaneously with the removal of dirt and dust particles therefrom.

In cleaning floors with vacuum cleaners, an elongated nozzle is usually provided which is connected to a suitable source of partial vacuum so as to draw air through the nozzle. If the nozzle is resting upon the nap of a rug or similar article, the nap of the rug is usually flexed or bent to some extent as the nozzle moves over the same. This action assists in the removal of dust and dirt particles. In some vacuum cleaners additional means, such as brushes or the like are provided for increasing the agitation of the rug surface as the nozzle moves over the same.

Lights of certain types have been found useful in destroying bacteria and insects of various kinds. Lights such as those giving off ultraviolet rays or waves of other wave length have been used for destroying bacteria, insects and the like. While such lights have some power of penetration of filamentous structures, such as rug surfaces, the effectiveness of the light is greatly increased if the filaments are agitated as the rays are directed against the filaments.

It is the object of the present invention to provide a light capable of giving off light waves of a type suitable for destroying bacteria and the like and to mount this light for movement over a floor surface. As a result the rays of the light are directed downwardly against the floor and may be used to kill bacteria or insects with which they come in contact.

It is the object of the present invention to provide a support for a light capable of producing light rays of proper wave length to be destructive to bacteria and insects so that the light may be moved over the floor in closely spaced relation thereto. The light is preferably mounted to direct rays against the portion of a floor covering engaged by the support as it is moved over such a covering. When such a support is used upon the surface of a rug having a filamentous covering the light rays are thus directed against the portion of the rug being agitated or disturbed by the support, thereby increasing the area against which the light rays are directed.

A feature of the present invention lies in supporting a light capable of producing rays which are injurious to bacteria and insects in close proximity to the floor where the rays will have greatest effect in killing bacteria and insects. The effectiveness of a light of the type described is usually decreased as the distance between the light source and the bacteria or insects increases. By supporting the light closely adjacent to the floor, maximum results may be obtained.

A further feature of the preferred form of my invention resides in placing the light within the nozzle or casing of the support so as to position the light source in the area most affected by application of suction or the like. Movement of the nozzle or vacuum cleaner head over the surface of a rug or similar floor covering tends to flex the nap of the rug so that most of the length of the filaments is exposed. By directing the light against the bent filaments on the rug, a deeper penetration of the rays and a greater effectiveness of the light may be obtained.

These and other objects and novel features of my invention will be more clearly and fully set forth in the following specification and claims.

In the drawings forming a part of my specification:

Figure 1:
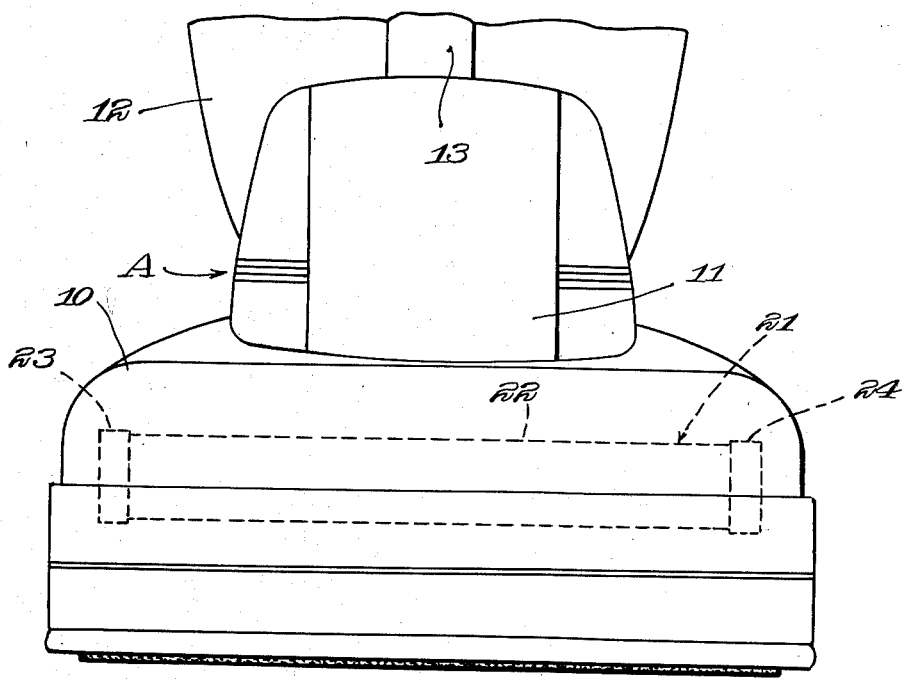
Figure 1 is a front elevational view showing a vacuum cleaner, indicating diagrammatically a light tube supported therein.

My device is capable of a variation of designs and my light may be supported by the nozzle or head of a vacuum cleaner of almost any shape or design. The particular construction illustrated shows a vacuum cleaner head of the type which is usually mounted on casters or rollers and moved over the floor surface by means of a handle. In the particular construction illustrateted the head includes a relatively wide body 10 which includes air passages, and which is usually supported by casters or rollers not illustrated in the drawings. The head usually includes a fan and motor chamber 11 which includes a suction fan and a suitable means of propelling the same, neither of which are illustrated in detail in the drawings. The suction fan usually forces air from the intake nozzle into a porous bag 12, or the like, and the head 10 is usually moved along the floor surface by means of a suitable handle 13.

Figure 2:
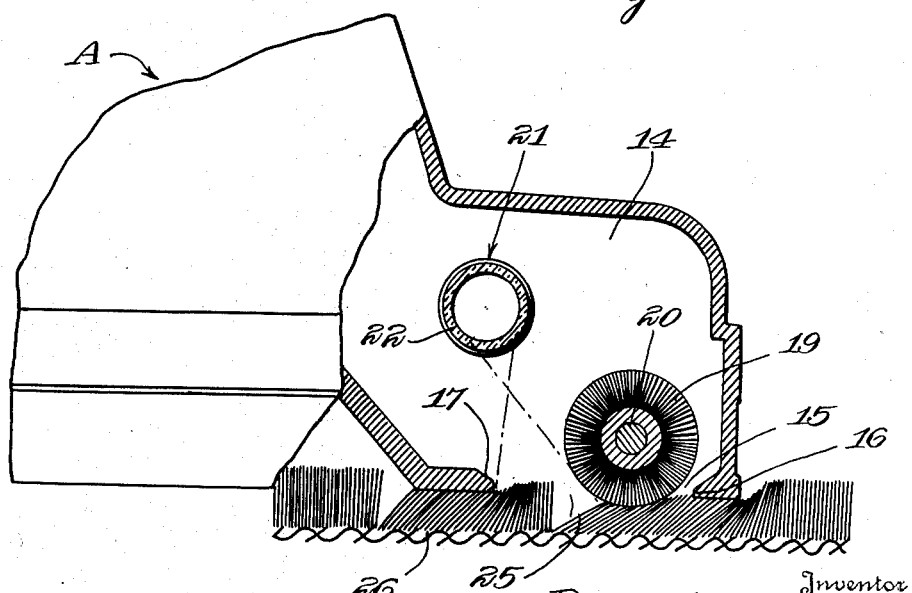
Figure 2 is a side elevational view of the vacuum cleaner partially in section to show a typical manner of supporting the light source.

The vacuum cleaner A is shown as having an air passage 14 through the head to direct air from the intake opening 15 or nozzle portion of the device to the suction fan. The intake opening or nozzle is usually elongated across the body of the vacuum cleaner near the forward end thereof and the intake opening is shown as being defined by a rearwardly extending forward lip 16 and a forwardly extending rear lip 17. A brush 19 is mounted upon a suitable shaft 20 extending transversely of the casing and this brush is rotated by the vacuum cleaner motor in the particular style of a cleaner illustrated. The brush 19 is shown as being rotated in a counter-clockwise direction as viewed in Figure 2 of the drawings.

The light source is indicated in general by the numeral 21. This light source includes an elongated transparent or translucent tubular body 22 having end caps 23 and 24 at opposite ends thereof. The light source 21 is capable of generating light waves of proper wave length to be injurious to the health of bacteria and insects. The light bulb 23 is connected to a suitable source of current supply which may comprise the power source usually used for operating the vacuum cleaner motor. If desired suitable transformer means or coils may be used to increase the frequency of the current.

It will be noted that the light source 21 is mounted above and rearwardly of the rotary brush 19 so as to direct light against the bent filaments 25 of the rug 26. The filamentous covering or nap of the rug is bent by contact with the rotating brush 19 so that the light may be directed against a relatively long stretch of the filaments 25. As a result a larger portion of the length of each filament is directly, or almost directly, in line with the light rays given off by the light 21. While in this position the light source 11 is more capable of destroying bacteria or insects than would otherwise be possible.

While I have found that it is beneficial to support a light closely adjacent a floor surface, I have found that results are better if the light is mounted to contact portions of the nap of the rug being bent or distorted by the vacuum cleaner head or nozzle as it is moved over the floor surface. I have also found that movement of air into the opening 15 tends to agitate the various fibers and for this reason it is particularly desirable that the light source be mounted in the portion of the structure being subjected to a suction effect.

In accordance with the patent statutes, I have described the principles of construction and operation of my floor sterilizer, and while I have endeavored to set forth the best embodiment thereof, I desire to have it understood that obvious changes may be made within the scope of the following claims without departing from the spirit of my invention.

I claim:

1. A rug sterilizing apparatus having an elongated transversely extending suction nozzle having a nozzle opening in the lower surface thereof, means movably supporting said nozzle with its opening in close proximity with a rug, a rotary brush rotatably supported to extend with its axis extending longitudinally of the nozzle and extending through the nozzle opening, a source of light of a type capable of producing ultra violet rays in sufficient quantity to be harmful to bacteria positioned within said nozzle and located to direct rays toward said brush and through said nozzle opening on one side of said brush, and means rotating said brush in such a manner that the bottom of the brush is traveling away from said light source, said brush flexing the nap of the rug away from said light source to permit the direct rays to be directed toward the base of the nap.

2. The structure defined in claim 1 and in which the light source is elongated and generally parallel to the axis of the brush.

References Cited in the file of this patent

UNITED STATES PATENTS

| Number | Name | Date |
|---|---|---|
| 759,141 | Thurman | May 3, 1904 |
| 796,114 | Currey | Aug. 1, 1905 |
| 1,228,669 | Hardey | June 5, 1917 |
| 1,297,525 | Wood | Mar. 18, 1919 |
| 1,527,224 | Riordan | Feb. 24, 1925 |
| 1,582,677 | Goodall | Apr. 27, 1926 |
| 1,676,782 | Jackson | July 10, 1928 |
| 1,829,582 | Carson | Oct. 27, 1931 |
| 1,863,534 | Odell | June 14, 1932 |
| 1,903,427 | Martin | Apr. 11, 1933 |
| 2,242,163 | Bargeboer | May 13, 1941 |
| 2,309,546 | Shapiro | Jan. 26, 1943 |
| 2,335,056 | Grison | Nov. 23, 1943 |
| 2,354,817 | Law | Aug. 1, 1944 |
| 2,590,152 | Buckey | Mar. 25, 1952 |